United States Patent
Kuroda et al.

(10) Patent No.: US 11,752,897 B2
(45) Date of Patent: Sep. 12, 2023

(54) POWER SUPPLY APPARATUS

(71) Applicant: DENSO CORPORATION, Kariya (JP)

(72) Inventors: Daisuke Kuroda, Kariya (JP); Shimpei Takita, Kariya (JP); Shingo Kawahara, Kariya (JP); Shunsuke Tomoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 729 days.

(21) Appl. No.: 16/387,653

(22) Filed: Apr. 18, 2019

(65) Prior Publication Data
US 2019/0241136 A1     Aug. 8, 2019

Related U.S. Application Data

(63) Continuation of application No. PCT/JP2017/037831, filed on Oct. 19, 2017.

(30) Foreign Application Priority Data

Oct. 21, 2016  (JP) .................. 2016-206755

(51) Int. Cl.
*B60L 58/20*  (2019.01)
*B60R 16/033*  (2006.01)
(Continued)

(52) U.S. Cl.
CPC .............. *B60L 58/20* (2019.02); *B60L 50/50* (2019.02); *B60L 58/10* (2019.02); *B60R 16/02* (2013.01);
(Continued)

(58) Field of Classification Search
CPC ....... B60R 16/033; B60R 16/02; B60R 16/03; H02J 7/14; H02J 7/00; H02J 7/1423;
(Continued)

(56) References Cited

U.S. PATENT DOCUMENTS 5,483,433 A * 1/1996 Yang ................... H02M 7/483
                                                  363/43
9,457,684 B2 * 10/2016 Crombez ............... B60L 58/10
(Continued)

FOREIGN PATENT DOCUMENTS

JP  2003-040050 A   2/2003
JP  2014-036531 A   2/2014
(Continued)

OTHER PUBLICATIONS

Dec. 5, 2017 International Search Report issued in International Patent Application No. PCT/JP2017/037831.

*Primary Examiner* — Daniel Kessie
*Assistant Examiner* — Brian K Baxter
(74) *Attorney, Agent, or Firm* — Oliff PLC (57) ABSTRACT

A power supply apparatus includes a storage battery and supplies a voltage from the battery to an electric load. The power supply apparatus includes first and second energizing paths connected in parallel between the battery and the load, a first switch making the first energizing path conductive and interrupting the first energizing path, and a second switch making the second energizing path conductive and interrupting the second energizing path. The power supply apparatus includes a first drive circuit that operates when a voltage is supplied and drives the first switch, a second drive circuit that operates when a voltage is supplied and drives the second switch into a conductive state in a case where the first switch is driven into a conductive state by the first drive circuit, first and second supply paths respectively supplying a voltage to the first and second drive circuits.

12 Claims, 4 Drawing Sheets

(51) Int. Cl.
*H02J 7/14* (2006.01)
*H01M 10/44* (2006.01)
*B60L 58/10* (2019.01)
*B60L 50/50* (2019.01)
*B60R 16/02* (2006.01)
*H02J 7/00* (2006.01)

(52) U.S. Cl.
CPC ......... *B60R 16/033* (2013.01); *H01M 10/441* (2013.01); *H02J 7/00* (2013.01); *H02J 7/14* (2013.01); *H02J 7/1423* (2013.01); *H02J 7/1446* (2013.01); *H01M 2220/20* (2013.01); *H02J 2310/46* (2020.01)

(58) Field of Classification Search
CPC ...... H02J 7/007; H02J 7/1446; H01M 10/441; H01M 2220/20; B60L 58/10; B60L 50/50; B60L 3/0046; B60L 3/0092; B60L 1/00; B60L 58/20
See application file for complete search history.

(56) References Cited

U.S. PATENT DOCUMENTS

| | | | | |
|---|---|---|---|---|
| 10,807,547 | B2* | 10/2020 | Obayashi | F02D 41/0007 |
| 2001/0007419 | A1* | 7/2001 | Tanaka | H02J 7/1415 |
| | | | | 323/285 |
| 2002/0036479 | A1* | 3/2002 | Aoyagi | H02J 7/0025 |
| | | | | 320/103 |
| 2006/0132111 | A1* | 6/2006 | Jacobs | G05F 1/618 |
| | | | | 323/282 |
| 2007/0035183 | A1* | 2/2007 | Shimizu | H02J 9/061 |
| | | | | 307/126 |
| 2009/0174353 | A1* | 7/2009 | Nakamura | H02M 3/337 |
| | | | | 318/400.27 |
| 2011/0121661 | A1* | 5/2011 | Kawakami | H02J 7/35 |
| | | | | 307/110 |
| 2013/0026992 | A1* | 1/2013 | Ruan | H01M 10/4207 |
| | | | | 320/118 |
| 2013/0234504 | A1* | 9/2013 | Morita | B60R 16/03 |
| | | | | 307/9.1 |
| 2013/0257062 | A1* | 10/2013 | Sakakibara | F02N 11/0814 |
| | | | | 290/38 R |
| 2014/0077595 | A1* | 3/2014 | Kakuya | H02J 7/35 |
| | | | | 307/110 |
| 2014/0091619 | A1 | 4/2014 | Yoshimi | |
| 2016/0114695 | A1* | 4/2016 | Holgers | B60L 3/0046 |
| | | | | 701/22 |
| 2016/0190940 | A1* | 6/2016 | Yan | B60R 16/03 |
| | | | | 307/9.1 |

FOREIGN PATENT DOCUMENTS

| | | |
|---|---|---|
| JP | 5541134 B2 | 7/2014 |
| JP | 2015-168292 A | 9/2015 |
| JP | 2016-093004 A | 5/2016 |
| JP | 2016-149935 A | 8/2016 |
| JP | 2016-155492 A | 9/2016 |
| WO | 2014/025064 A1 | 2/2014 |

* cited by examiner

POWER SUPPLY APPARATUS

CROSS-REFERENCE TO RELATED APPLICATION

The present application is based on Japanese Patent Application No. 2016-206755 filed on Oct. 21, 2016, and the contents of which are incorporated herein by reference.

BACKGROUND

Technical Field

The present disclosure relates to a power supply apparatus mounted in a vehicle or the like.

Related Art

Conventionally, as a power supply apparatus mounted in a vehicle, there are known ones that use a plurality of storage batteries, such as a lead storage battery and a lithium-ion storage battery, and supply electric power from these storage batteries to various in-vehicle electric loads via switches.

SUMMARY

One aspect of the present disclosure is
a power supply apparatus which includes a storage battery and supplies a voltage from the storage battery to an electric load, the power supply apparatus including:

a first energizing path and a second energizing path connected in parallel between the storage battery and the electric load;

a first switch that makes the first energizing path conductive and interrupts the first energizing path;

a second switch that makes the second energizing path conductive and interrupts the second energizing path;

a first drive circuit that operates on condition that a voltage is supplied and drives the first switch;

a second drive circuit that operates on condition that a voltage is supplied and drives the second switch into a conductive state in a case where the first switch is driven into a conductive state by the first drive circuit;

a first supply path that supplies a voltage to the first drive circuit; and a second supply path that supplies a voltage to the second drive circuit.

BRIEF DESCRIPTION OF THE DRAWINGS

The above-described objects, other objects, features, and advantages of the present disclosure will become more apparent from the following detailed description with reference to the accompanying drawings.

DETAILED DESCRIPTION OF THE PREFERRED EMBODIMENTS

Conventionally, as a power supply apparatus mounted in a vehicle, there are known ones that use a plurality of storage batteries, such as a lead storage battery and a lithium-ion storage battery, and supply electric power from these storage batteries to various in-vehicle electric loads via switches (refer to JP 5541134 B).

Meanwhile, there is a case where objects to which a power supply apparatus supplies electric power include a constant-voltage request load for which drive by a constant voltage is required. In this case, even if a part of the power supply apparatus fails, it is preferable that a voltage supplied to the constant-voltage request load does not drop. Note that, not limited to the constant-voltage request load, but also for a general electric load, such an actual condition is common in general.

The present disclosure has been made in view of the above problem, and a main object thereof is to provide a power supply apparatus capable of suppressing drop of a voltage supplied to an electric load even if a part of the power supply apparatus fails.

The first aspect for solving the above problem is
a power supply apparatus which includes a storage battery and supplies a voltage from the storage battery to an electric load, the power supply apparatus including:

a first energizing path and a second energizing path connected in parallel between the storage battery and the electric load;

a first switch that makes the first energizing path conductive and interrupts the first energizing path;

a second switch that makes the second energizing path conductive and interrupts the second energizing path;

a first drive circuit that operates on condition that a voltage is supplied and drives the first switch;

a second drive circuit that operates on condition that a voltage is supplied and drives the second switch into a conductive state in a case where the first switch is driven into a conductive state by the first drive circuit;

a first supply path that supplies a voltage to the first drive circuit; and a second supply path that supplies a voltage to the second drive circuit.

According to the above configuration, the first energizing path and the second energizing path are connected in parallel between the storage battery and the electric load. The first energizing path is made conductive and interrupted by the first switch and the second energizing path is made conductive and interrupted by the second switch. Thus, when the first switch makes the first energizing path conductive, a voltage of the storage battery is supplied to the electric load through the first energizing path. Further, when the second switch makes the second energizing path conductive, a voltage of the storage battery is supplied to the electric load through the second energizing path.

Here, the first switch is driven by the first drive circuit that operates on condition that a voltage is supplied. Further, the second switch is driven by the second drive circuit that operates on condition that a voltage is supplied. Hence, when a voltage is not supplied to the first drive circuit and the second drive circuit, the first drive circuit and the second drive circuit do not operate and cannot drive the first switch and the second switch. As a result, a voltage may not be supplied from the storage battery to the electric load.

On that point, when the first switch is driven into a conductive state by the first drive circuit, the second switch is driven into a conductive state by the second drive circuit. Then, a voltage is supplied to the first drive circuit by the first supply path, and a voltage is supplied to the second drive circuit by the second supply path. Hence, for example, when the first switch and the second switch are driven into a conductive state by the first drive circuit and the second drive circuit, respectively, even if a voltage is not supplied to the first drive circuit by the first supply path, a voltage is supplied to the second drive circuit by the second supply path. Therefore, the second switch is driven into a conductive state by the second drive circuit and the second energizing path can be made conductive.

Furthermore, also when the first drive circuit fails or the first switch fails and the first energizing path cannot be made conductive, similarly a voltage can be supplied to the electric load through the second energizing path. In addition, when the second energizing path cannot be made conductive, a voltage can be supplied to the electric load through the first energizing path. Therefore, even if a part of the power supply apparatus fails, it is possible to suppress drop of the voltage supplied to the electric load.

Note that, the first aspect is assumed to include also a configuration including the above-described first energizing path, first switch, and first drive circuit, a third energizing path similar to the first supply path, a third switch, a third drive circuit, a third supply path, and the like. That is, a configuration including a third path and fourth path, if it includes at least the above configuration of the first aspect, is also included in the first aspect.

The second aspect is a power supply apparatus which includes a first storage battery and a second storage battery and supplies voltages from the first storage battery and the second storage battery to an electric load, the power supply apparatus including:

a first energizing path and a second energizing path connected in parallel between the first storage battery and the electric load;

a third energizing path and a fourth energizing path connected in parallel between the second storage battery and the electric load;

a first switch that makes the first energizing path conductive and interrupts the first energizing path;

a second switch that makes the second energizing path conductive and interrupts the second energizing path;

a third switch that makes the third energizing path conductive and interrupts the third energizing path;

a fourth switch that makes the fourth energizing path conductive and interrupts the fourth energizing path;

a first drive circuit that operates on condition that a voltage is supplied and drives the first switch;

a second drive circuit that operates on condition that a voltage is supplied and drives the second switch into a conductive state in a case where the first switch is driven into a conductive state by the first drive circuit;

a third drive circuit that operates on condition that a voltage is supplied and drives the third switch;

a fourth drive circuit that operates on condition that a voltage is supplied and drives the fourth switch into a conductive state in a case where the third switch is driven into a conductive state by the third drive circuit;

a first supply path that supplies a voltage to the first drive circuit;

a second supply path that supplies a voltage to the second drive circuit;

a third supply path that supplies a voltage to the third drive circuit; and a fourth supply path that supplies a voltage to the fourth drive circuit.

According to the above configuration, configurations similar to the first aspect are provided respectively corresponding to the first storage battery and the second storage battery. Hence, it is possible to switch among a state in which a voltage is supplied from the first storage battery to the electric load, a state in which a voltage is supplied from the second storage battery to the electric load, and a state in which voltages are supplied from the first storage battery and the second storage battery to the electric load. Then, even if a part of the power supply apparatus fails, a voltage can be supplied to the electric load through any of the first to fourth energizing paths, and it is possible to further suppress drop of the voltage supplied to the electric load.

With the third aspect, voltages are supplied from a plurality of voltage supply parts to a voltage output part, and a voltage is supplied from the voltage output part to the first supply path and the second supply path.

According to the above configuration, voltages are supplied from a plurality of voltage supply parts to the voltage output part. Hence, even if a voltage is not supplied from one voltage supply part to the voltage output part, the voltages can be supplied from the other voltage supply parts to the voltage output part. Then, a voltage is supplied from the voltage output part to the first supply path and the second supply path. Hence, it is possible to suppress drop of the voltage supplied to the first supply path and the second supply path, and eventually it is possible to suppress drop of the voltage supplied to the first drive circuit and the second drive circuit. Further, since voltages supplied from a plurality of voltage supply parts are collected to the voltage output part and a voltage is supplied from the voltage output part to the first supply path and the second supply path, the circuit configuration can be simplified.

With the fourth aspect, voltages are supplied from a plurality of voltage supply parts to a voltage output part, and a voltage is supplied from the voltage output part to the first supply path, the second supply path, the third supply path, and the fourth supply path.

According to the above configuration, similar to the third aspect, it is possible to suppress drop of the voltage supplied to the first to fourth supply paths, and eventually it is possible to suppress drop of the voltage supplied to the first to fourth drive circuits. Further, since voltages supplied from a plurality of voltage supply parts are collected to the voltage output part and a voltage is supplied from the voltage output part to the first to fourth supply paths, the circuit configuration can be further simplified.

With the fifth aspect, the plurality of voltage supply parts include a plurality of common voltage supply parts connected to the common storage battery.

According to the above configuration, the plurality of voltage supply parts include a plurality of common voltage supply parts connected to the common storage battery. Hence, even if a voltage is supplied from the common storage battery, a plurality of common voltage supply parts can be prepared. Then, when voltages are supplied from the plurality of common voltage supply parts to the voltage output part, even if a voltage is not supplied from one common voltage supply part to the voltage output part, voltages can be supplied from the other common voltage supply parts to the voltage output part. Therefore, even if a voltage is supplied from the common storage battery, it is possible to suppress drop of the voltage supplied to the electric load.

With the sixth aspect, each of the plurality of common voltage supply parts is connected to the common storage battery via a connector.

According to the above configuration, each of the plurality of common voltage supply parts is connected to the common storage battery via a connector. Hence, even if the connector connecting the storage battery and one common voltage supply part has a defective connection, voltages can be supplied from the other common voltage supply parts, which are connected correctly, to the voltage output part. Therefore, even if some connectors have defective connections, it is possible to suppress drop of the voltage supplied to the electric load.

With the seventh aspect, the plurality of voltage supply parts include a plurality of independent voltage supply parts connected to different storage batteries, respectively.

According to the above configuration, the plurality of voltage supply parts include a plurality of independent voltage supply parts connected to different storage batteries, respectively. Hence, even if a voltage is not supplied from one storage battery to the independent voltage supply part, a voltage can be supplied from the independent voltage supply part connected to the different storage battery to the voltage output part. Therefore, even if voltages are not supplied from some storage batteries, it is possible to suppress drop of the voltage supplied to the electric load.

With the eighth aspect, the first supply path is connected to a first storage battery, and the second supply path is connected to a second storage battery independently from the first supply path.

According to the above configuration, the first supply path and the second supply path are independently connected to the first storage battery and the second storage battery, respectively. Hence, as compared with the configuration in which the first supply path and the second supply path include a common path, it is possible to suppress simultaneous disconnection or the like of the first supply path and the second supply path. Therefore, it is possible to further suppress drop of the voltage supplied to the electric load.

With the ninth aspect, a voltage is supplied from the first storage battery to the first supply path and the third supply path, and a voltage is supplied from the second storage battery to the second supply path and the fourth supply path.

According to the above configuration, a voltage is supplied from the first storage battery to the first supply path, and a voltage is supplied from the second storage battery to the second supply path. Hence, voltages are supplied from the first storage battery and the second storage battery respectively to the first drive circuit and the second drive circuit that respectively drive the first switch and the second switch connected in parallel. Therefore, even if the first storage battery or the second storage battery fails, a voltage can be supplied to the electric load through the first energizing path or the second energizing path. Further, since the first storage battery and the second storage battery that supply a voltage to the electric load also function as a storage battery that supplies a voltage to the first drive circuit and the second drive circuit, the existing storage battery can be effectively used. Note that, the same concept can be applied also to the third supply path and the fourth supply path.

With the tenth aspect, a first control part that operates on condition that a voltage is supplied and controls the first drive circuit, a second control part that operates on condition that a voltage is supplied and controls the second drive circuit, a first control part supply path that supplies a voltage to the first control part, and a second control part supply path that supplies a voltage to the second control part are provided.

According to the above configuration, the first drive circuit is controlled by the first control part and the second drive circuit is controlled by the second control part. Then, a voltage is supplied to the first control part by the first control part supply path and a voltage is supplied to the second control part by the second control part supply path. Hence, for example, even if the voltage is not supplied to the first control part by the first control part supply path or the first control part fails, the voltage is supplied to the second control part by the second control part supply path and the second drive circuit is controlled by the second control part. Therefore, even if some control parts among the control parts that control the respective drive circuits do not operate, it is possible to suppress drop of the voltage supplied to the electric load.

With the eleventh aspect, a first control part that operates on condition that a voltage is supplied and controls the first drive circuit and the third drive circuit, a second control part that operates on condition that a voltage is supplied and controls the second drive circuit and the fourth drive circuit, a first control part supply path that supplies a voltage to the first control part, and a second control part supply path that supplies a voltage to the second control part are provided.

According to the above configuration, the first drive circuit and the third drive circuit are controlled by the first control part, and the second drive circuit and the fourth drive circuit are controlled by the second control part. In this case, effects similar to those of the tenth aspect can be provided in the third drive circuit and the fourth drive circuit.

With the twelfth aspect, a fifth supply path that supplies a voltage to the first drive circuit, and a sixth supply path that supplies a voltage to the second drive circuit are provided.

According to the above configuration, in addition to that a voltage is supplied to the first drive circuit by the first supply path, a voltage is supplied to the first drive circuit by the fifth supply path. That is, voltages are supplied to the first drive circuit from a plurality of supply paths. Hence, for example, even if a voltage is not supplied to the first drive circuit from the first supply path, a voltage is supplied to the first drive circuit from the fifth supply path, and the first switch can be driven by the first drive circuit. Therefore, even if voltages are not supplied from some supply paths among a plurality of supply paths that supply voltages to the first drive circuit, it is possible to prevent the first drive circuit from not operating. Note that, the same concept can be applied also to the second drive circuit.

With the thirteenth aspect, a fifth supply path that supplies a voltage to the first drive circuit, a sixth supply path that supplies a voltage to the second drive circuit, a seventh supply path that supplies a voltage to the third drive circuit, and an eighth supply path that supplies a voltage to the fourth drive circuit are provided.

According to the above configuration, in addition to that a voltage is supplied to the third drive circuit by the third supply path, a voltage is supplied to the third drive circuit by the seventh supply path. Further, in addition to that a voltage is supplied to the fourth drive circuit by the fourth supply path, a voltage is supplied to the fourth drive circuit by the eighth supply path. In this case, effects similar to those of the twelfth aspect can be provided in the third drive circuit and the fourth drive circuit.

With the fourteenth aspect, a first delay circuit that operates on condition that a voltage is supplied and delays a signal to the first drive circuit, a second delay circuit that operates on condition that a voltage is supplied and delays a signal to the second drive circuit, a third delay circuit that operates on condition that a voltage is supplied and delays a signal to the third drive circuit, a fourth delay circuit that operates on condition that a voltage is supplied and delays a signal to the fourth drive circuit, a first delay circuit supply path that supplies a voltage to the first delay circuit, a second delay circuit supply path that supplies a voltage to the second delay circuit, a third delay circuit supply path that supplies a voltage to the third delay circuit, and a fourth delay circuit supply path that supplies a voltage to the fourth delay circuit are provided.

According to the above configuration, signals to the first to fourth drive circuits are delayed by the first to fourth delay circuits, respectively. Then, voltages are supplied to the first to fourth delay circuits by the first to fourth delay circuit supply paths, respectively. Hence, for example, even if the voltage is not supplied to the first delay circuit by the first delay circuit supply path or the first delay circuit fails, the voltage is supplied to the second delay circuit by the second delay circuit supply path and the second switch is driven by the second drive circuit. Therefore, even if some delay circuits among the delay circuits that delay the signals to the respective drive circuits do not operate, it is possible to suppress drop of the voltage supplied to the electric load.

Hereinafter, an embodiment embodied in a power supply system to be mounted in a vehicle will be described with reference to drawings. The vehicle runs using an engine (internal combustion engine) as a drive source. The vehicle has a so-called idling stop function.

Figure 1:
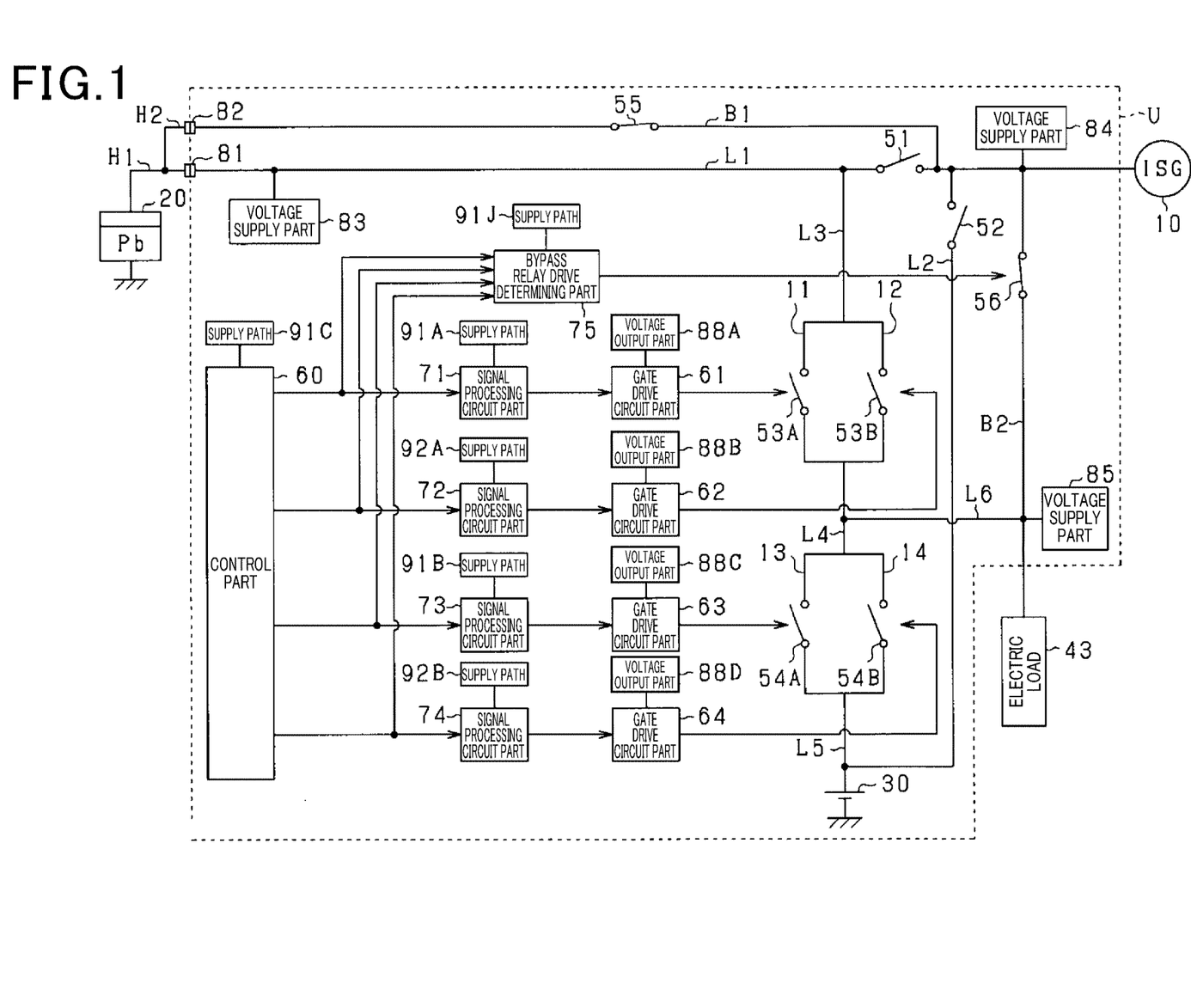
FIG. 1 is a circuit diagram showing a power supply apparatus, an electric load, and a rotary machine.

As shown in FIG. 1, the power supply system includes a rotary machine 10, a lead storage battery 20, a battery unit U, an electric load 43, and the like. The power supply apparatus is composed of the lead storage battery 20 and the battery unit U.

The battery unit U is integrated by housing, in a housing (housing case), a lithium-ion storage battery 30, respective switches 51 to 56, a control part 60, signal processing circuit parts 71 to 74, gate drive circuit parts 61 to 64, and the like. The respective switches 51 to 56, the control part 60, the signal processing circuit parts 71 to 74, and the gate drive circuit parts 61 to 64 are housed in the housing in a state in which they are mounted on the same substrate.

A rotary shaft of the rotary machine 10 is drivingly connected to a crankshaft of an engine (not shown) by a belt or the like, the rotary shaft of the rotary machine 10 is rotated by rotation of the crankshaft, and the crankshaft is rotated by rotation of the rotary shaft of the rotary machine 10. In this case, the rotary machine 10 has a power generation function of performing power generation (regenerative power generation) by rotation of the crankshaft, and a power output function of giving a rotational force to the crankshaft and constitutes an ISG (Integrated Stater Generator). As for output power of the rotary machine 10, when engine restart is performed by idling stop control, the engine is restarted by the rotary machine 10. In addition, output assist by the rotary machine 10 is available during vehicle running.

The lead storage battery 20 and the lithium-ion storage battery 30 are electrically connected in parallel to the rotary machine 10, and each storage battery 20, 30 can be charged by the generated power of the rotary machine 10. The rotary machine 10 is driven by power feeding from each storage battery 20, 30.

The lead storage battery 20 (corresponding to a first storage battery) is a well-known general-purpose storage battery that supplies a voltage of 12 V, for example. In contrast, the lithium-ion storage battery 30 (corresponding to a second storage battery) has a smaller power loss in charging and discharging than that of the lead storage battery 20 and is a high-density storage battery having a high output density and a high energy density. The lithium-ion storage battery 30 is composed of an assembled battery formed by connecting a plurality of battery cells in series and supplies a voltage of 12 V, for example.

The battery unit U is connected with the rotary machine 10, the lead storage battery 20, and the electric load 43. The lead storage battery 20 is connected to a connection path L1 of the battery unit U by a harness H1. The harness H1 and the connection path L1 are connected via a connector 81. A harness H2 is branched from the harness H1. The lead storage battery 20 is connected to a first bypass path B1 of the battery unit U by the harness H2. The harness H2 and the first bypass path B1 are connected via a connector 82.

A P-MOS switch 51 is provided in the connection path L1. In the connection path L1, a connection path L3 is connected to the lead storage battery 20 side of the P-MOS switch 51. Energizing paths 11, 12 are connected in parallel between the connection path L3 and a connection path L4. The energizing path 11 (corresponding to a first energizing path) is provided with an S-MOS switch 53A (corresponding to a first switch). The energizing path 12 (corresponding to a second energizing path) is provided with an S-MOS switch 53B (corresponding to a second switch). Energizing paths 13, 14 are connected in parallel between the connection path L4 and a connection path L5. The energizing path 13 (corresponding to a third energizing path) is provided with an S-SMR switch 54A (corresponding to a third switch). The energizing path 14 (corresponding to a fourth energizing path) is provided with an S-SMR switch 54B (corresponding to a fourth switch). The lithium-ion storage battery 30 is connected to the connection path L5.

In the connection path L1, the first bypass path B1, the connection path L2, and the second bypass path B2 are connected in parallel to the rotary machine 10 side of the P-MOS switch 51. The first bypass path B1 is provided with a first bypass switch 55 that makes the first bypass path B1 conductive and interrupts the first bypass path B1.

In the connection path L1, one end of the connection path L2 is connected to the rotary machine 10 side of the P-MOS switch 51. The other end of the connection path L2 is connected to the connection path L5. The connection path L2 is provided with a P-SMR switch 52. The switches 51 to 54B are composed of MOSFETs (semiconductor switches) or the like, and make the respective paths conductive and interrupt the respective paths.

In the connection path L1, one end of the second bypass path B2 is connected to the rotary machine 10 side of the P-MOS switch 51. The other end of the second bypass path B2 is connected to the electric load 43. The second bypass path B2 is provided with a second bypass switch 56 that makes the second bypass path B2 conductive and interrupts the second bypass path B2. The connection path L4 and the second bypass path B2 are connected by a connection path L6.

The first bypass switch 55 and the second bypass switch 56 are normally closed type relay switches. The first bypass path B1 connects the lead storage battery 20 with the rotary machine 10 and the lithium-ion storage battery 30 while bypassing the P-MOS switch 51. In addition, when the first bypass path B1 and the second bypass path B2 are connected in series, the lead storage battery 20 is connected to the electric load 43 while bypassing the S-MOS switches 53A, 53B.

The control part 60 performs switching between ON (close) and OFF (open) states of the respective switches 51 to 54B. For example, during discharging of each storage battery 20, 30, the switches 51 to 54B are basically controlled so as to interrupt the connection between the lead storage battery 20 and the lithium-ion storage battery 30, and flowing of current from the lead storage battery 20 to the lithium-ion storage battery 30 and flowing of current from the lithium-ion storage battery 30 to the lead storage battery 20 are suppressed. This enables suppression of power loss accompanied with flowing of current between both the storage batteries.

Further, the control part 60 is connected to an ECU (Electronic Control Unit) outside the battery unit. That is, the control part 60 and ECU are connected by a communication network, such as CAN, and can communicate with each other and can mutually share various data stored in the control part 60 and the ECU. The ECU performs idling stop control. The idling stop control, as is well known, automatically stops an engine when a predetermined automatic stop condition is met, and restarts the engine when a predetermined restart condition is met under the automatic stop state.

The electric load 43 is a constant-voltage request electric load for which it is required that the voltage of supply power is approximately constant, or the voltage fluctuation is within a predetermined range and is stable. The electric load 43 is connected with the lead storage battery 20 via the S-MOS switches 53A, 53B and is connected with the lithium-ion storage battery 30 via the S-SMR switches 54A, 54B, and power feeding is performed from any of the lead storage battery 20 and the lithium-ion storage battery 30.

Specific examples of the electric load 43 include an in-vehicle navigation device, an in-vehicle audio device, a meter device, and various ECUs, such as an engine ECU. For example, when the voltage of supply power is not constant and greatly fluctuates, or when the voltage greatly fluctuates beyond the predetermined range, the voltage momentarily drops below the minimum operation voltage, which causes a defect of resetting the operation of the in-vehicle navigation device, the ECU, or the like. Thus, for the power supplied to the electric load 43, it is required that the voltage is stable at a constant value which does not drop below the minimum operation voltage.

The rotary machine 10 generates power using rotational energy of the crankshaft of the engine. The power generated by the rotary machine 10 is supplied to the electric load 43 and is supplied to the lead storage battery 20 and the lithium-ion storage battery 30. When the drive of engine stops and power is not generated in the rotary machine 10, power is supplied from the lead storage battery 20 and the lithium-ion storage battery 30 to the rotary machine 10 and the electric load 43. A discharge amount from each storage battery 20, 30 to the rotary machine 10 and the electric load 43 and a charge amount from the rotary machine 10 to each storage battery 20, 30 are controlled to be in a range (an appropriate range) in which a state of charge (SOC: a ratio of an actual charging amount with respect to a charging amount at a fully charged time) of each storage battery 20, 30 is not over charge or over discharge.

The control part 60 switches the S-MOS switches 53A, 53B into ON states simultaneously (both) and also switches them into OFF states simultaneously (both). That is, the control part 60, when switching the S-MOS switch 53A into an ON state, switches also the S-MOS switch 53B into an ON state. In addition, the control part 60 switches the S-SMR switches 54A, 54B into ON states simultaneously (both) and also switches them into OFF states simultaneously (both). That is, the control part 60, when switching the S-SMR switch 54A into an ON state, switches also the S-MOS switch 54B into an ON state.

The control part 60 switches only one pair into an ON state among a pair of the S-MOS switches 53A, 53B and a pair of the S-SMR switches 54A, 54B. In addition, the control part 60, when an IG switch (start switch) of the vehicle is in an ON state, switches at least one of the P-MOS switch 51 and the P-SMR switch 52 into an ON state.

The control part 60 outputs instruction signals that instruct to change ON/OFF states of the S-MOS switches 53A, 53B and the S-SMR switches 54A, 54B, respectively. The signal processing circuit parts 71 to 74 (corresponding to first to fourth delay circuits) respectively delay the instruction signals that instruct switching of ON/OFF of the switches 53A to 54B at the time of switching of ON/OFF, respectively. Here, the signal processing circuit parts 71 to 74 set the delay time (OFF delay time) when changing the switches 53A to 54B from ON states to OFF states to be longer than the delay time (ON delay time) when changing the switches 53A to 54B from OFF states to ON states.

The S-MOS switches 53A, 53B and the S-SMR switches 54A, 54B are MOS-FET switches of positive logic and become in ON states when the gate voltages are set to be high states by input of drive current from the gate drive circuit parts 61 to 64, respectively. In addition, when the gate voltages are set to be low, they become OFF states. Note that, the gate drive circuit parts 61 to 64, respectively, output the drive currents when signals input from the signal processing circuit parts 71 to 74 become high states from low states, and stop the drive currents when the signal input from the signal processing circuit part 70 becomes a low state from a high state.

A bypass relay drive determining part 75 receives instruction signals output from the control part 60 to the signal processing circuit parts 71 to 74 and switches the bypass switch 56 into an ON state on condition that all of the instruction signals to the switches 53A to 54B are OFF instruction signals. That is, the bypass relay drive determining part 75, when at least one of the instruction signals to the switches 53A to 54B is an ON instruction signal, switches the bypass switch 56 into an OFF state. In addition, the control part 60 switches the first bypass switch 55 into an ON state on condition that all of the instruction signals to the P-MOS switch 51 and the P-SMR switch 52 are OFF instruction signals. That is, the control part 60, when at least one of the instruction signals to the P-MOS switch 51 and the P-SMR switch 52 is the ON instruction signal, switches the first bypass switch 55 into an OFF state.

The bypass switches 55, 56 are normally closed type relay switches. The normally closed type relay switch can be said to be a negative logic type switch. The normally closed type relay switch becomes in an OFF state when the voltage input from the bypass relay drive determining part 75 to a reactor of the relay switch is made to be a high state and becomes in an ON state when the voltage input from the bypass relay drive determining part 75 to the reactor of the relay switch is made to be a low state.

Here, the control part 60, the signal processing circuit parts 71 to 74, the gate drive circuit parts 61 to 64, and the bypass relay drive determining part 75 operate on condition that a predetermined voltage is supplied. Specifically, the control part 60, the signal processing circuit parts 71 to 74, and the bypass relay drive determining part 75 operate on condition that a voltage of 5 V is supplied. The gate drive circuit parts 61 to 64 operate on condition that a voltage of 12 V is supplied.

In this regard, the battery unit U is provided with voltage supply parts 83 to 85. The voltage supply part 83 (corresponding to a common voltage supply part) is connected between the connector 81 (lead storage battery 20) and the P-MOS switch 51 in the connection path L1. The voltage supply part 84 (corresponding to a common voltage supply part) is connected to an intersection between the connection path L1 and the second bypass path B2. That is, the voltage supply parts 83, 84 are connected to the common lead storage battery 20 via the connectors 81, 82, respectively. The voltage supply part 85 is connected to an intersection between the second bypass path B2 and the connection path L4. The voltage supply parts 83, 84 and the voltage supply part 85 are respectively connected to the lead storage battery and the lithium-ion storage battery 30 and correspond to independent voltage supply parts connected to different storage batteries, respectively.

Figure 2:
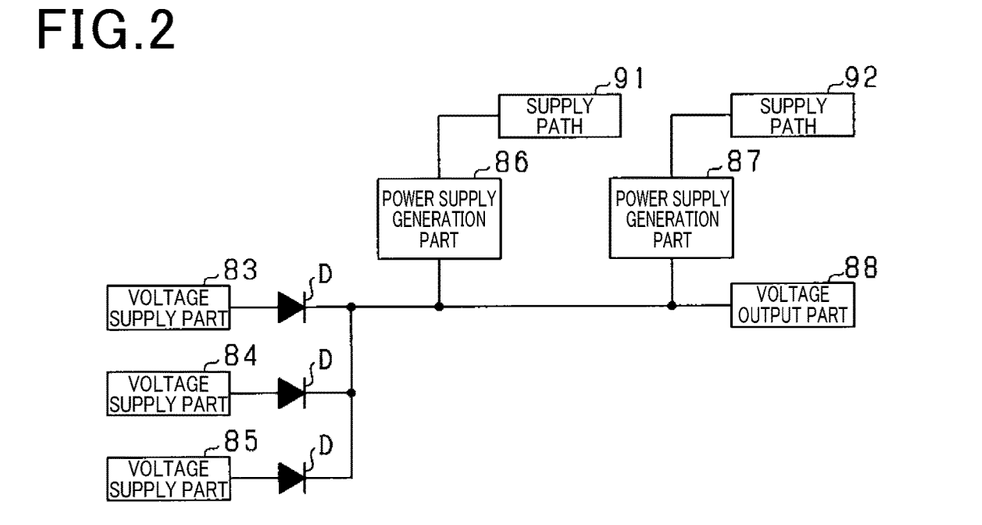
FIG. 2 is a circuit diagram showing a power supply.

FIG. 2 is a circuit diagram showing a power supply that supplies voltages to the control part 60, the signal processing circuit parts 71 to 74, the gate drive circuit parts 61 to 64, and the bypass relay drive determining part 75. The voltage supply parts 83 to 85 are connected in parallel to a voltage output part 88 via diodes D, respectively. The anodes of the diodes D are respectively connected to the voltage supply parts 83 to 85, and the cathodes are connected to the voltage output part 88. The voltage output part 88 is, as shown in FIG. 1, connected to voltage output parts 88A to 88D that supply voltages to the gate drive circuit parts 61 to 64, respectively. That is, voltages are supplied from the voltage supply parts 83 to 85 to the voltage output part 88, and voltages are supplied from the voltage output part 88 to the voltage output parts 88A to 88D (corresponding to first to fourth supply paths).

Power supply generation parts 86, 87 are connected in parallel to the voltage output part 88. The power supply generation parts 86, 87 generate voltages of 5 V based on a voltage supplied to the voltage output part 88 and supply the voltages to supply paths 91, 92, respectively. The supply path 91 is, as shown in FIG. 1, connected to supply paths 91A, 91B (corresponding to first and third delay circuit supply paths) that supply voltages to the signal processing circuit parts 71, 73, respectively. The supply path 91 is connected to a supply path 91C that supplies a voltage to the control part 60. The supply path 91 is connected to a supply path 91J that supplies a voltage to the bypass relay drive determining part 75. The supply path 92 is connected to supply paths 92A, 92B (corresponding to second and fourth delay circuit supply paths) that supply voltages to the signal processing circuit parts 72, 74, respectively.

Next, an operation example of the power supply apparatus having such a configuration will be described.

The energizing path 11 and the energizing path 12 are connected in parallel between the lead storage battery 20 and the electric load 43. The energizing path 11 is made conductive and interrupted by the S-MOS switch 53A, and the energizing path 12 is made conductive and interrupted by the S-MOS switch 53B. Hence, when the S-MOS switch 53A makes the energizing path 11 conductive, the voltage of the lead storage battery 20 is supplied to the electric load 43 through the energizing path 11. In addition, when the S-MOS switch 53B makes the energizing path 12 conductive, the voltage of the lead storage battery 20 is supplied to the electric load 43 through the energizing path 12.

Here, the S-MOS switch 53A is driven by the gate drive circuit part 61 that operates on condition that a voltage is supplied. In addition, the S-MOS switch 53B is driven by the gate drive circuit part 62 that operates on condition that a voltage is supplied. Hence, when the voltage is not supplied to the gate drive circuit part 61 and the gate drive circuit part 62, the gate drive circuit part 61 and the gate drive circuit part 62 do not operate, and the S-MOS switch 53A and the S-MOS switch 53B cannot be driven. As a result, a voltage may not be supplied from the lead storage battery 20 to the electric load 43.

On that point, when the S-MOS switch 53A is driven into a conductive state by the gate drive circuit part 61, the S-MOS switch 53B is driven into a conductive state by the gate drive circuit part 62. Then, a voltage is supplied to the gate drive circuit part 61 by the voltage output part 88A, and a voltage is supplied to the gate drive circuit part 62 by the voltage output part 88B. Hence, for example, while the S-MOS switches 53A, 53B are driven into the conductive state by the gate drive circuit parts 61, 62, respectively, even if the voltage is not supplied to the gate drive circuit part 61 due to disconnection or the like of the voltage output part 88A, the voltage is supplied to the gate drive circuit part 62 by the voltage output part 88B. Therefore, the S-MOS switch 53B is driven into the conductive state by the gate drive circuit part 62, and the energizing path 12 can be made conductive.

Further, even if the gate drive circuit part 61 fails or the S-MOS switch 53A fails and the energizing path 11 cannot be made conductive, similarly the voltage can be supplied to the electric load 43 through the energizing path 12. Therefore, even if a part of the power supply apparatus fails, it is possible to suppress drop of the voltage supplied to the electric load 43.

In addition, when the S-MOS switches 53A, 53B are in ON states and the S-SMR switches 54A, 54B are in OFF states, if the power supply generation part 86 fails, the following operation is performed. In this case, a voltage is not supplied from the supply path 91C to the control part 60, and the control part 60 cannot operate. Hence, all of the instruction signals from the control part 60 to the signal processing circuit parts 71 to 74, the P-MOS switch 51, and the P-SMR switch 52 become in OFF states. Therefore, the first bypass switch 55 is set to an ON state. Further, voltages are not supplied from the supply paths 91A, 91B to the signal processing circuit parts 71, 73, and the signal processing circuit parts 71, 73 cannot operate. Hence, the signals input from the signal processing circuit parts 71, 73 to the gate drive circuit parts 61, 63 become low states, and the gate voltages input from the gate drive circuit parts 61, 63 to the S-MOS switch 53A and the S-SMR switch 54A become low states. Therefore, the S-MOS switch 53A and the S-SMR switch 54A become in low states.

However, voltages are supplied from the supply paths 92A, 92B to the signal processing circuit parts 72, 74, respectively, and the off instructions from the control part 60 to the signal processing circuit parts 72, 74 are delayed. In addition, a voltage is not supplied from the supply path 91J to the bypass relay drive determining part 75, and the bypass relay drive determining part 75 cannot operate. Hence, the voltage input from the bypass relay drive determining part 75 to the bypass switch 56 becomes low state, and the normally closed type bypass switch 56 becomes an ON state. Therefore, the bypass switches 55, 56 become ON states while switching of the S-MOS switch 53B and the S-SMR switch 54B to the OFF state is delayed, and a voltage is supplied from the lead storage battery 20 to the electric load 43 through the bypass paths B1, B2.

In addition, when the S-MOS switches 53A, 53B are in ON states and the S-SMR switches 54A, 54B are in OFF states, if the power supply generation part 87 fails, the following operation is performed. In this case, voltages are not supplied from the supply paths 92A, 92B to the signal processing circuit parts 72, 74, and the signal processing circuit parts 72, 74 cannot operate. Hence, the signals input from the signal processing circuit parts 72, 74 to the gate drive circuit parts 62, 64 become low states, and the gate voltages input from the gate drive circuit parts 62, 64 to the S-MOS switch 53B and the S-SMR switch 54B become low states. Therefore, the S-MOS switch 53B and the S-SMR switch 54B become low states.

However, the ON state of the S-MOS switch 53A is continued by the control part 60. Hence, a voltage is supplied from the lead storage battery 20 to the electric load 43 through the connection path L1, the S-MOS switch 53A, the connection path L4, and the connection path L6.

The present embodiment described above in detail has the following advantages.

The energizing paths 11, 12 and the energizing paths 13, 14 are provided corresponding to the lead storage battery 20 and the lithium-ion storage battery 30. Hence, it is possible to switch between a state in which a voltage is supplied from the lead storage battery 20 to the electric load 43 and a state in which a voltage is supplied from the lithium-ion storage battery 30 to the electric load 43. Even if a part of the power supply apparatus fails, a voltage can be supplied to the electric load 43 through any of the energizing paths 11 to 14, and it is possible to suppress drop of the voltage supplied to the electric load 43.

Voltages are supplied from a plurality of the voltage supply parts 83 to 85 to the voltage output part 88. Hence, even if the voltage is not supplied from one voltage supply part to the voltage output part 88, the voltages can be supplied from the other voltage supply parts to the voltage output part 88. Then, a voltage is supplied from the voltage output part 88 to the voltage output parts 88A to 88D. Hence, it is possible to suppress drop of the voltage supplied to the voltage output parts 88A to 88D, and eventually it is possible to suppress drop of the voltage supplied to the gate drive circuit parts 61 to 64. Further, since voltages supplied from the plurality of voltage supply parts 83 to 85 are collected to the voltage output part 88 and a voltage is supplied to the voltage output parts 88A to 88D from the voltage output part 88, the circuit configuration can be simplified.

The plurality of voltage supply parts 83 to 85 include the voltage supply parts 83, 84 connected to the common lead storage battery 20. Hence, even if a voltage is supplied from the common lead storage battery 20, the plurality of voltage supply parts 83, 84 can be prepared. Then, when voltages are supplied from the plurality of voltage supply parts 83, 84 to the voltage output part 88, even if a voltage is not supplied from one voltage supply part to the voltage output part 88, voltages can be supplied from the other voltage supply parts to the voltage output part 88. Therefore, even when a voltage is supplied from the common lead storage battery 20, it is possible to suppress drop of the voltage supplied to the electric load 43.

The plurality of voltage supply parts 83, 84 are connected to the common lead storage battery 20 via the connectors 81, 82, respectively. Hence, even if a connector that connects the lead storage battery 20 and one voltage supply part causes a connection failure, voltages can be supplied from the other voltage supply parts, for which connector connection is good, to the voltage output part 88. Therefore, even if some connectors cause connection failures, it is possible to suppress drop of the voltage supplied to the electric load 43.

The plurality of voltage supply parts 83 to 85 include the plurality of voltage supply parts 83, 85 (84, 85) connected to the different storage batteries, respectively. Hence, even if the voltage is not supplied from one storage battery to a voltage supply part, a voltage can be supplied from a voltage supply part connected to a different storage battery to the voltage output part 88. Therefore, even if a voltage is not supplied from some storage batteries, it is possible to suppress drop of the voltage supplied to the electric load 43.

Signals to the gate drive circuit parts 61 to 64 are delayed by the signal processing circuit parts 71 to 74, respectively. Then, voltages are supplied to the signal processing circuit parts 71 to 74 by the supply paths 91A to 92B, respectively. Hence, for example, even if a voltage is not supplied to the signal processing circuit part 71 by the supply path 91A or the signal processing circuit part 71 fails, a voltage is supplied to the signal processing circuit part 72 by the supply path 92A, and the S-MOS switch 53B is driven by the gate drive circuit part 62. Therefore, even if some signal processing circuit parts of the signal processing circuit parts 71 to 74 that delay the signals to the respective gate drive circuit parts 61 to 64 do not operate, it is possible to suppress drop of the voltage supplied to the electric load 43.

Note that, the above-described embodiment may be modified and implemented as below. The same portion as that of the above embodiment will be attached with the same reference sign and thereby the description thereof will be omitted.

It is also possible to adopt a configuration in which the harness H1 and the connection path L1 are directly connected without via the connector 81, and a configuration in which the harness H2 and the first bypass path B1 are directly connected without via the connector 82.

Figure 3:
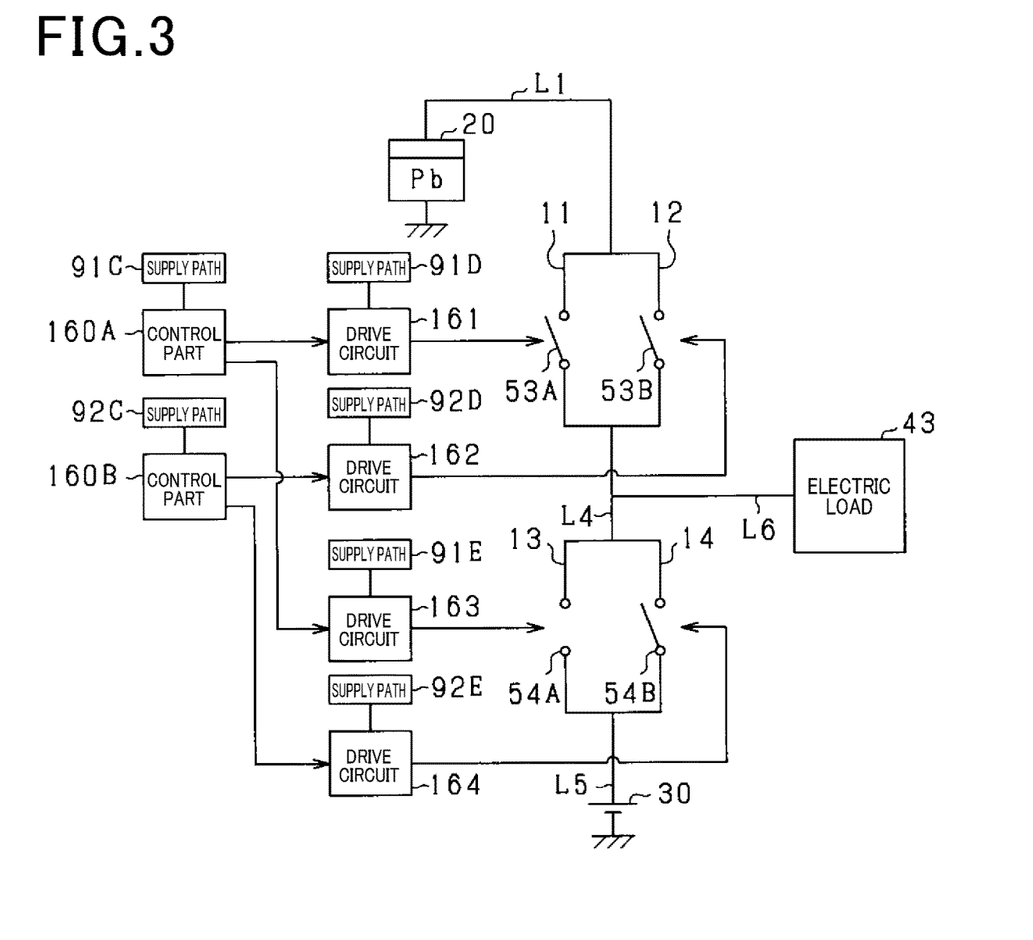
FIG. 3 is a circuit diagram showing a modified example of the power supply apparatus.

The power supply apparatus shown in FIG. 3 includes a control part 160A (a first control part) which operates on condition that a voltage is supplied and controls a drive circuit 161 (a first drive circuit) and a drive circuit 163 (a third drive circuit), a control part 160B (a second control part) which operates on condition that a voltage is supplied and controls a drive circuit 162 (a second drive circuit) and a drive circuit 164 (a fourth drive circuit), a supply path 91C (a first control part supply path) which supplies a voltage to the control part 160A, and a supply path 92C (a second control part supply path) which supplies a voltage to the control part 160B. Note that, the drive circuits 161 to 164 may respectively include the gate drive circuit parts 61 to 64 and the signal processing circuit parts 71 to 74 or may respectively include only the drive circuit parts 61 to 64.

According to the above configuration, the drive circuits 161, 163 are controlled by the control part 160A, and the drive circuits 162, 164 are controlled by the control part 160B. Then, a voltage is supplied to the first control part by the supply path 91C, and a voltage is supplied to the control part 160B by the supply path 92C. Hence, even if a voltage is not supplied to the control part 160A by the supply path 91C or the control part 160A fails, a voltage is supplied to the control part 160B by the supply path 92C, and the drive circuits 162, 164 are controlled by the control part 160B. Therefore, even if some control parts of the control parts 160A, 160B that control the respective drive circuits 161 to 164 do not operate, it is possible to suppress drop of the voltage supplied to the electric load 43.

Figure 4:
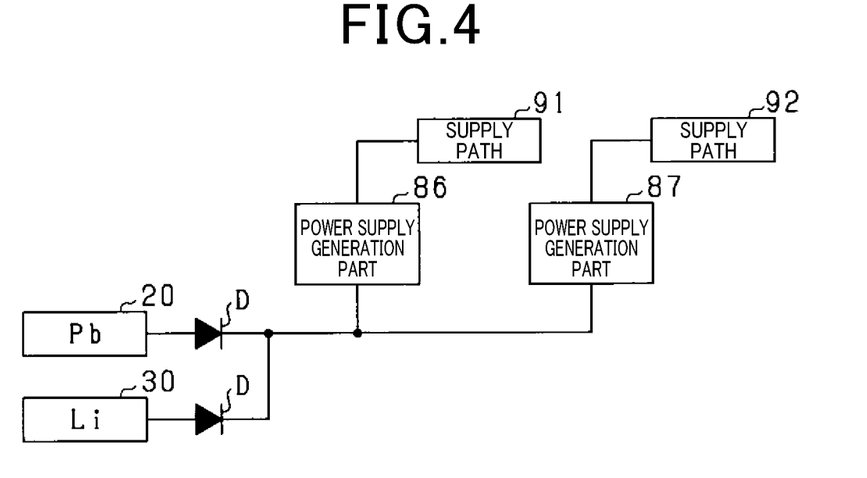
FIG. 4 is a circuit diagram showing a modified example of the power supply.

As the power supply that supplies a voltage to the power supply apparatus in FIG. 3, a power supply shown in FIG.

4 can be adopted. The lead storage battery 20 (a first storage battery) and the lithium-ion storage battery 30 (a second storage battery) are connected in parallel. In addition, the power supply generation parts 86, 87 are connected in parallel to the lead storage battery 20 and the lithium-ion storage battery 30 via the diodes D, respectively. The anodes of the diodes D are respectively connected to the lead storage battery 20 and the lithium-ion storage battery 30, and the cathodes are connected to the power supply generation parts 86, 87. Here, the power supply generation part 86 generates a predetermined voltage based on the voltages supplied from the lead storage battery 20 and the lithium-ion storage battery 30 and supplies the generated voltage to the supply path 91. The power supply generation part 87 generates a predetermined voltage based on the voltages supplied from the lead storage battery 20 and the lithium-ion storage battery 30 and supplies the generated voltage to the supply path 92. The supply path 91 is, as shown in FIG. 3, connected to the supply paths 91C, 91D, and 91E that supply voltages to the control part 160A, and the drive circuits 161, 163, respectively. The supply path 92 is connected to the supply paths 92C, 92D, and 92E that supply voltages to the control part 160B, and the drive circuits 162, 164, respectively.

Figure 5:
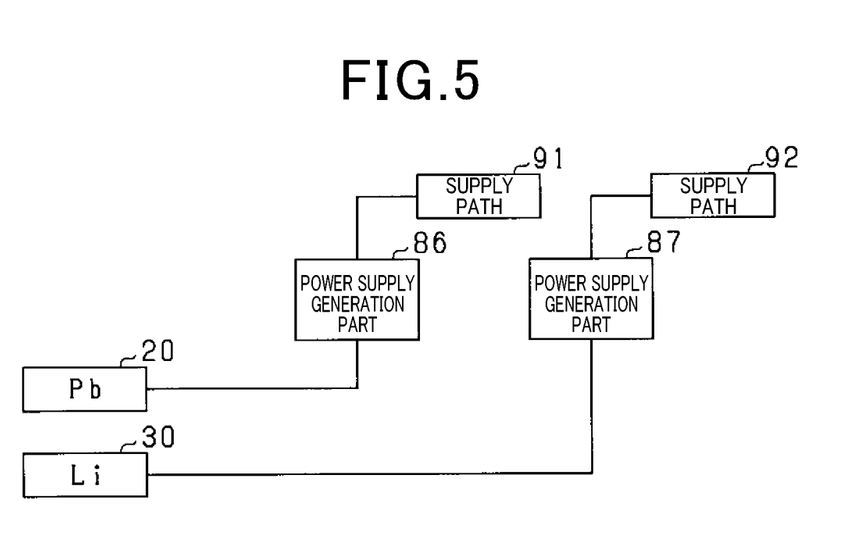
FIG. 5 is a circuit diagram showing another modified example of the power supply.

As the power supply that supplies a voltage to the power supply apparatus in FIG. 3, a power supply shown in FIG. 5 can be adopted. The power supply generation parts 86, 87 are connected to the lead storage battery 20 (a first storage battery) and the lithium-ion storage battery 30 (a second storage battery), respectively. That is, the supply path 92 (power supply generation part 87) is connected to the lithium-ion storage battery 30 independently of the supply path 91 (power supply generation part 86). According to the above configuration, the supply path 91 (91C, 91D, 91E) and the supply path 92 (92C, 92D, 92E) are independently connected to the lead storage battery 20 and the lithium-ion storage battery 30, respectively. Hence, as compared with a configuration in which the supply path 91 and the supply path 92 include the common path, it is possible to suppress simultaneous disconnection or the like of the supply path 91 and the supply path 92. Therefore, it is possible to further suppress drop of the voltage supplied to the electric load 43.

In addition, even if the lead storage battery 20 or the lithium-ion storage battery 30 fails, a voltage can be supplied to the electric load 43 through the supply path 91 (91C, 91D, 91E) or the supply path 92 (92C, 92D, 92E). Further, since the lead storage battery 20 and the lithium-ion storage battery 30 that supply voltages to the electric load 43 also function as the storage batteries that supply voltages to the drive circuits 161, 163 and the drive circuits 162, 164, respectively, the existing storage batteries 20, 30 can be used effectively.

In FIG. 2, the voltage supply parts 83, 84 and the voltage supply part 85 are connected to the lead storage battery 20 and the lithium-ion storage battery 30, respectively. In contrast, it is also possible to adopt a configuration not including the voltage supply part 85, that is, a configuration not including independent voltage supply parts respectively connected to different storage batteries.

Figure 6:
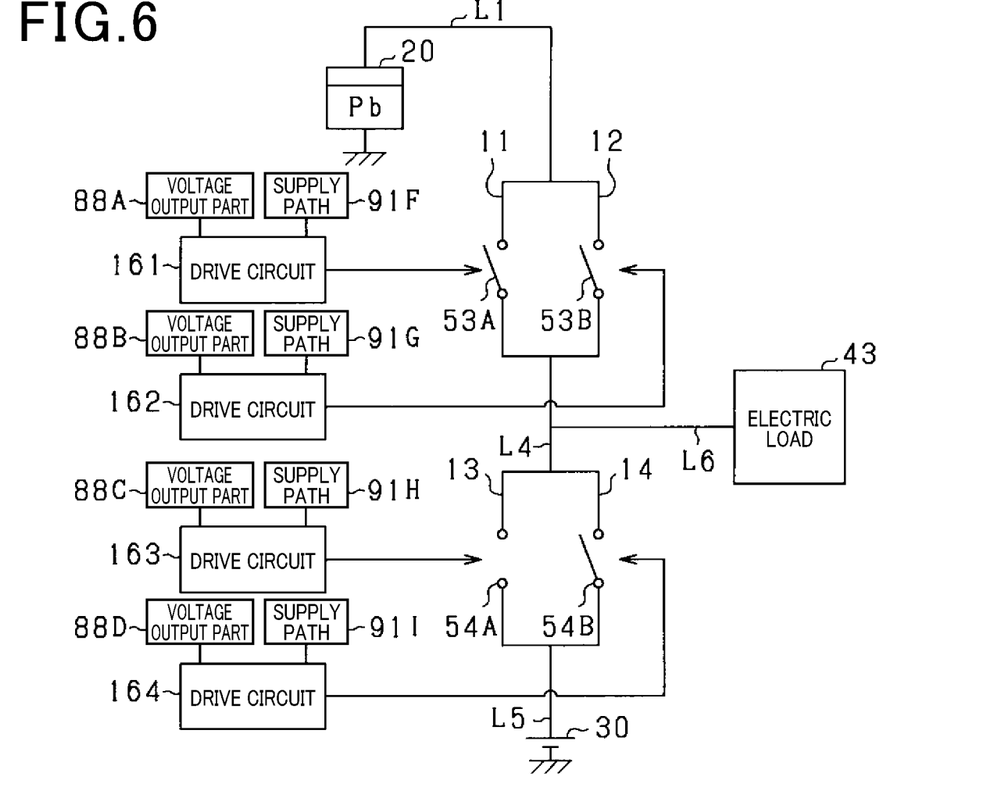
FIG. 6 is a circuit diagram showing another modified example of the power supply apparatus.

A power supply apparatus shown in FIG. 6 includes a supply path 91F (a fifth supply path) that supplies a voltage to the drive circuit 161 (a first drive circuit), a supply path 91G (a sixth supply path) that supplies a voltage to the drive circuit 162 (a second drive circuit), a supply path 91H (a seventh supply path) that supplies a voltage to the drive circuit 163 (a third drive circuit), and a supply path 91I (an eighth supply path) that supplies a voltage to the drive circuit 164 (a fourth drive circuit).

According to the above configuration, for example, in addition to that a voltage is supplied to the drive circuit 161 by the voltage output part 88A (a first supply path), a voltage is supplied to the drive circuit 161 by the supply path 91F. That is, voltages are supplied to the drive circuit 161 from a plurality of supply paths. Hence, for example, even if a voltage is not supplied to the drive circuit 161 from the voltage output part 88A, the voltage is supplied to the drive circuit 161 from the supply path 91F, and the S-MOS switch 53A (first switch) can be driven by the drive circuit 161. Therefore, even if voltages are not supplied from some supply paths of the plurality of supply paths that supply voltages to the drive circuit 161, it is possible to prevent the drive circuit 161 from not operating. The same concept can be applied also to the drive circuits 162 to 164.

Figure 7:
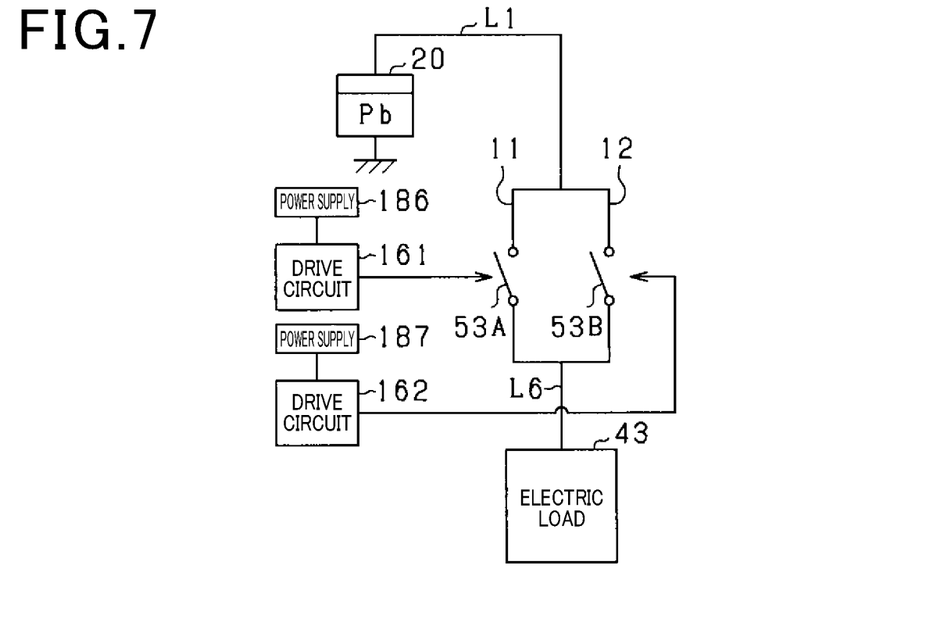
FIG. 7 is a circuit diagram showing another modified example of the power supply apparatus.

The above-described embodiment and each modified example can be also applied to a power supply apparatus that supplies a voltage from only one lead storage battery 20 (storage battery) to the electric load 43, as shown in FIG. 7. As a power supply 186, an arbitrary power supply, such as the voltage output part 88 in FIG. 2, supply path 91, power supply generation part 86, lead storage battery 20, and IG voltage output part connected to the lead storage battery 20 via the IG switch, can be adopted. In addition, as a power supply 187, an arbitrary power supply, such as the voltage output part 88 in FIG. 2, supply path 92, power supply generation part 87, lithium-ion storage battery 30, and IG voltage output part connected to the lithium-ion storage battery 30 via the IG switch, can be adopted. Note that, the electric load 43 is not limited to a constant voltage request load, but may be a general electric load.

The storage batteries are not limited to the lead storage battery 20 and the lithium-ion storage battery 30, but an NiH storage battery or the like can be also adopted, and any combination of these storage batteries can be used. In addition, the voltage supplied by the battery is not limited to 12 V, but another voltage can be appropriately supplied.

In FIG. 1, a configuration in which, in addition to the energizing paths 11, 12, other energizing paths are connected in parallel between the connection path L3 and the connection path L4 can be also adopted. In that case, an S-MOS switch is provided in the other energizing path and is driven by a drive circuit similar to the gate drive circuit part 61. With such a configuration, it is possible to further suppress drop of the voltage supplied to the electric load 43.

The present disclosure is written based on the embodiment, but it should be understood that the present disclosure is not limited to the embodiment and the structure. The present disclosure also includes various modified examples and variations in an equivalent range. In addition, various combinations and forms, and further, other combinations and forms including only one element, more elements, or less elements added thereto are also included in the category or conceptual range of the present disclosure.

What is claimed is:

1. A power supply apparatus which includes a first storage battery and a second storage battery and supplies voltages from the first storage battery and the second storage battery to an electric load, the power supply apparatus comprising:
   a first energizing path and a second energizing path connected in parallel between the first storage battery and the electric load;

a third energizing path and a fourth energizing path connected in parallel between the second storage battery and the electric load;

a first switch in the first energizing path and that selectively makes the first energizing path conductive and interrupted by being switched between a conductive state and a non-conductive state;

a second switch in the second energizing path and that selectively makes the second energizing path conductive and interrupted by being switched between the conductive state and the non-conductive state, the second switch being connected in parallel to the first switch so that current will flow from the first storage battery to the electric load (i) when the first switch makes the first energizing path conductive regardless of whether the second switch makes the second energizing path conductive or interrupted, and (ii) when the second switch makes the second energizing path conductive regardless of whether the first switch makes the first energizing path conductive or interrupted;

a third switch in the third energizing path and that selectively makes the third energizing path conductive and interrupted by being switched between the conductive state and the non-conductive state;

a fourth switch in the fourth energizing path and that selectively makes the fourth energizing path conductive and interrupted by being switched between the conductive state and the non-conductive state, the fourth switch being connected in parallel to the third switch so that current will flow from the second storage battery to the electric load (a) when the third switch makes the third energizing path conductive regardless of whether the fourth switch makes the fourth energizing path conductive or interrupted, and (b) when the fourth switch makes the fourth energizing path conductive regardless of whether the third switch makes the third energizing path conductive or interrupted;

a first drive circuit that operates when supplied with a predetermined voltage and drives the first switch between the conductive state and the non-conductive state based on a first control signal that is received by the first drive circuit, the first control signal being different from the predetermined voltage;

a second drive circuit that operates when supplied with the predetermined voltage and drives the second switch into the conductive state in a case where the first switch is driven into the conductive state by the first drive circuit based on a second control signal that is received by the second drive circuit, the second control signal being different from the predetermined voltage;

a third drive circuit that operates when supplied with the predetermined voltage and drives the third switch between the conductive state and the non-conductive state based on a third control signal that is received by the third drive circuit, the third control signal being different from the predetermined voltage;

a fourth drive circuit that operates when supplied with the predetermined voltage and drives the fourth switch into the conductive state in a case where the third switch is driven into the conductive state by the third drive circuit based on a fourth control signal that is received by the fourth drive circuit, the fourth control signal being different from the predetermined voltage;

a first supply path that supplies the predetermined voltage from a voltage output part to the first drive circuit;

a second supply path that supplies the predetermined voltage from the voltage output part to the second drive circuit;

a third supply path that supplies the predetermined voltage from the voltage output part to the third drive circuit; and a fourth supply path that supplies the predetermined voltage from the voltage output part to the fourth drive circuit, wherein the first storage battery and the second storage battery are connected in parallel.

2. The power supply apparatus according to claim 1, further comprising:

a plurality of voltage supply parts that supply voltages to the voltage output part.

3. The power supply apparatus according to claim 2, wherein the plurality of voltage supply parts include a plurality of common voltage supply parts connected to the first storage battery.

4. The power supply apparatus according to claim 3, wherein each of the plurality of common voltage supply parts is connected to the first storage battery via a connector.

5. The power supply apparatus according to claim 2, wherein the plurality of voltage supply parts include a plurality of independent voltage supply parts connected to different storage batteries, respectively, the different storage batteries including the first storage battery and the second storage battery.

6. The power supply apparatus according to claim 1, wherein the first storage battery is connected to the first supply path and the third supply path, and the second storage battery is connected to the second supply path and the fourth supply path.

7. The power supply apparatus according to claim 1, further comprising:

a first control part that operates when supplied with the predetermined voltage and controls the first drive circuit by supplying a first control signal to the first drive circuit;

a second control part that operates when supplied with the predetermined voltage and controls the second drive circuit by supplying a second control signal to the second drive circuit;

a first control part supply path that supplies the predetermined voltage from the voltage output part to the first control part; and a second control part supply path that supplies the predetermined voltage from the voltage output part to the second control part.

8. The power supply apparatus according to claim 1, further comprising:

a first control part that operates when supplied with the predetermined voltage and controls the first drive circuit by supplying a first control signal to the first drive circuit and controls the third drive circuit by supplying a third control signal to the third drive circuit;

a second control part that operates when supplied with the predetermined voltage and controls the second drive circuit by supplying a second control signal to the second drive circuit and controls the fourth drive circuit by supplying a fourth control signal to the fourth drive circuit;

a first control part supply path that supplies the predetermined voltage from the voltage output part to the first control part; and a second control part supply path that supplies the predetermined voltage from the voltage output part to the second control part.

9. The power supply apparatus according to claim 1, further comprising:

a fifth supply path that supplies the predetermined voltage from the voltage output part to the first drive circuit; and a sixth supply path that supplies the predetermined voltage from the voltage output part to the second drive circuit.

10. The power supply apparatus according to claim 1, further comprising:

a fifth supply path that supplies the predetermined voltage from the voltage output part to the first drive circuit;

a sixth supply path that supplies the predetermined voltage from the voltage output part to the second drive circuit;

a seventh supply path that supplies the predetermined voltage from the voltage output part to the third drive circuit; and an eighth supply path that supplies the predetermined voltage from the voltage output part to the fourth drive circuit.

11. The power supply apparatus according to claim 1, further comprising:

a first delay circuit that operates when supplied with the predetermined voltage and delays supply of a first control signal to the first drive circuit;

a second delay circuit that operates when supplied with the predetermined voltage and delays supply of a second control signal to the second drive circuit;

a third delay circuit that operates when supplied with the predetermined voltage and delays supply of a third control signal to the third drive circuit;

a fourth delay circuit that operates when supplied with the predetermined voltage and delays supply of a fourth control signal to the fourth drive circuit;

a first delay circuit supply path that supplies the predetermined voltage from the voltage output part to the first delay circuit;

a second delay circuit supply path that supplies the predetermined voltage from the voltage output part to the second delay circuit;

a third delay circuit supply path that supplies the predetermined voltage from the voltage output part to the third delay circuit; and a fourth delay circuit supply path that supplies the predetermined voltage from the voltage output part to the fourth delay circuit.

12. The power supply apparatus according to claim 1, wherein:

the first supply path is configured by a circuit different from the first energizing path, the second supply path is configured by a circuit different from the second energizing path, the third supply path is configured by a circuit different from the third energizing path, and the fourth supply path is configured by a circuit different from the fourth energizing path.

* * * * *